United States Patent [19]

Hettinga

[11] Patent Number: 5,139,714
[45] Date of Patent: Aug. 18, 1992

[54] PROCESS FOR INJECTION MOLDING A HOLLOW PLASTIC ARTICLE

[76] Inventor: Siebolt Hettinga, 2123 NW. 111th St., Des Moines, Iowa 50325

[21] Appl. No.: 709,359

[22] Filed: Jun. 3, 1991

[51] Int. Cl.$^5$ ............ B29C 45/00; B29C 67/20; B29D 22/00
[52] U.S. Cl. .................. 264/45.1; 264/53; 264/328.8; 264/328.12; 264/328.13; 264/328.14; 264/328.16; 264/572
[58] Field of Search ............ 264/85, 237, 328.8, 264/328.12, 328.13, 328.14, 328.16, 572, DIG. 65, 45.1, 53

[56] References Cited

U.S. PATENT DOCUMENTS

| | | |
|---|---|---|
| 2,331,688 | 10/1943 | Hobson . |
| 2,516,552 | 7/1950 | Clark et al. . |
| 2,710,427 | 6/1955 | Cantor . |
| 3,021,559 | 2/1962 | Strong . |
| 4,033,710 | 7/1977 | Hanning ............ 425/543 |
| 4,101,617 | 7/1978 | Friederich ............ 264/572 |
| 4,140,672 | 2/1979 | Kataoka ............ 264/45.1 |
| 4,247,515 | 1/1981 | Olabisi ............ 264/500 |
| 4,474,717 | 10/1984 | Hendry ............ 264/45.5 |
| 4,824,732 | 4/1989 | Hendry et al. ............ 428/542.8 |

OTHER PUBLICATIONS

"Hettinga's Simultaneous Approach: Liquid Blowing Agent", *Plastics Machinery and Equipment*, Dec. 1985.

*Primary Examiner*—Leo B. Tentoni
*Attorney, Agent, or Firm*—Brian J. Laurenzo; Kent A. Herink

[57] ABSTRACT

A process for injection molding a hollow plastic article in which a low pressure heat-activated gas is injected in combination with a plastic material into a mold cavity of a plastic injection mold unit. When the plastic material and heat-activated gas enter the mold cavity, the gas expands to outwardly exert pressure on the plastic material thereby urging the plastic material towards the walls of the mold cavity to, in turn, form the hollow portions of the hollow plastic article. The gas remains within the hollow plastic article and continues to exert outward pressure until the plastic article has substantially cooled and hardened at which time the gas becomes dormant. Accordingly, no venting of the gas from the plastic article is necessary.

27 Claims, 3 Drawing Sheets

PROCESS FOR INJECTION MOLDING A HOLLOW PLASTIC ARTICLE

BACKGROUND OF THE INVENTION

The present invention relates generally to the injection molding of plastics and, more particularly, to a process for injection molding a hollow plastic article wherein a low pressure heat-activated gas is combined with a plastic material during injection of the plastic material into a mold cavity of a plastic injection mold unit.

It is well known in the prior art such as U.S. Pat. No. 4,101,617 to combine a highly compressed gas such as nitrogen in a mold cavity with injected plastic material in order to expand and distribute the plastic material against the walls of the mold cavity thereby forming a hollow portion therein which is filled with the highly pressurized gas. Most of the prior art processes involve partially filling the mold cavity with a plastic material and then injecting the gas into the mold cavity. The gas snakes its way through the thickest sections which are still molten and thus offer the least resistance. It is at these sections where the hollow portions are formed.

However, these high pressure gases such as nitrogen have many drawbacks. As a molded plastic article cools and hardens, the plastic material shrinks. The expanded gases of the prior art are cold and therefore provide a chilling effect to the inside of the plastic article causing it to shrink faster than the outside of the article resulting in sink marks and other blemishes on the outside of the article.

The prior art gases are under extremely high pressures and must accordingly be vented prior to opening of the mold in order to avoid explosion of the plastic article. Since the greatest amount of cooling and hardening occurs after the plastic article has been removed from the mold, the prior art gases can not be used to continuously exert outer pressure on the plastic article throughout the complete cooling and hardening of the article. This results in unpredictable shrinkage deformation in the walls and any ribs in the plastic article and makes it extremely difficult to control the formation of plastic articles having walls that are of different thicknesses.

The chilling effect of the high pressure expanded gases of the prior art also makes it difficult to avoid high stress knit lines where the plastic material flows together from separate directions in a mold cavity. These knit lines are caused by the flow characteristics of the plastic material in which the center of a flow travels much faster than the sides of a flow. When two of these plastic material flows combine, a knit line is formed which is under a great deal of stress. The chilling effect of the prior art gases actually inhibits the flow of the plastic material and cannot, therefore, be used to counter these knit lines by squaring off the head of the flow.

It is also known in the prior art to use a liquid blowing agent to form a plastic article having an inner honeycomb-like structure of interconnected small voids. The blowing agent is introduced in a direction transverse to the flow of the plastic material. This turbulent introduction of the blowing agent causes the formation of the small voids and is not, therefore, capable of forming a hollow plastic article.

The difficulties encountered in the prior art discussed hereinabove are substantially eliminated by the present invention.

SUMMARY OF THE INVENTION

Accordingly, it is an object of the present invention to provide a process for molding a hollow plastic article wherein a low pressure heat-activated gas remains within the plastic article and continues to exert gentle outward pressure throughout much of the cooling and hardening of the plastic article.

A further object of the present invention is to provide a process for molding a hollow plastic article wherein the heretofore necessary venting of the inner gas is eliminated.

Another object of the present invention is to provide a process for molding a hollow plastic article wherein the low pressure heat-activated gas used to form the hollow portions of the plastic article becomes dormant after substantial cooling and hardening of the plastic article.

Yet another object of the present invention is to provide a process for molding a hollow plastic article wherein sink marks and other blemishes in the outer surface of the plastic article and unequal shrinkage in the inner walls and ribs of the plastic article are reduced or eliminated.

One other object of the present invention is to provide a process for making a hollow plastic article wherein the clamping tonnage or pressure, as well as mold costs are reduced.

One further object of the present invention is to provide a process for making a hollow plastic article wherein the formation of high stress knit lines in the flow of the plastic material are reduced.

These and other objects of the invention will become apparent upon reference to the following specification, drawings and claims.

By the present invention, it is proposed to overcome the difficulties encountered heretofore. To this end, a low pressure liquid or solid substance is introduced into combination with a plastic material and heated to its gasification temperature during injection with the plastic material into a mold cavity for a hollow plastic article. When the plastic material and heat-activated gas enter the mold cavity where the pressure is reduced, the gas expands to exert pressure outwardly on the plastic material thereby urging the plastic material towards the walls of the mold cavity to, in turn, form the hollow portions of the plastic article. Since the gas is under low pressure, no venting of the gas prior to opening of the mold is necessary. Because the gas remains within the hollow plastic article, it continues to exert gentle and declining outward pressure until the plastic article has substantially cooled and hardened thereby reducing or eliminating deformations due to unequal shrinkage. After substantial cooling and hardening, the gas becomes dormant and will not be reactivated. The low pressure heat-activated gas is safer and eliminates the chilling effects of the prior art. Furthermore, since much lower pressures are required in the process of the present invention, lower clamp tonnage is required and tooling and utility costs are reduced.

DETAILED DESCRIPTION OF THE INVENTION

In the figures, a process for injection molding a plastic article 20 which is hollow in at least a portion thereof is illustrated wherein hollow portions at 22 and 24 are formed by injecting a solid or liquid substance which has been heat-activated into its gaseous form in combination with a molten plastic material 28 into a mold cavity 30 of a plastic injection mold unit 32.

Figure 1:
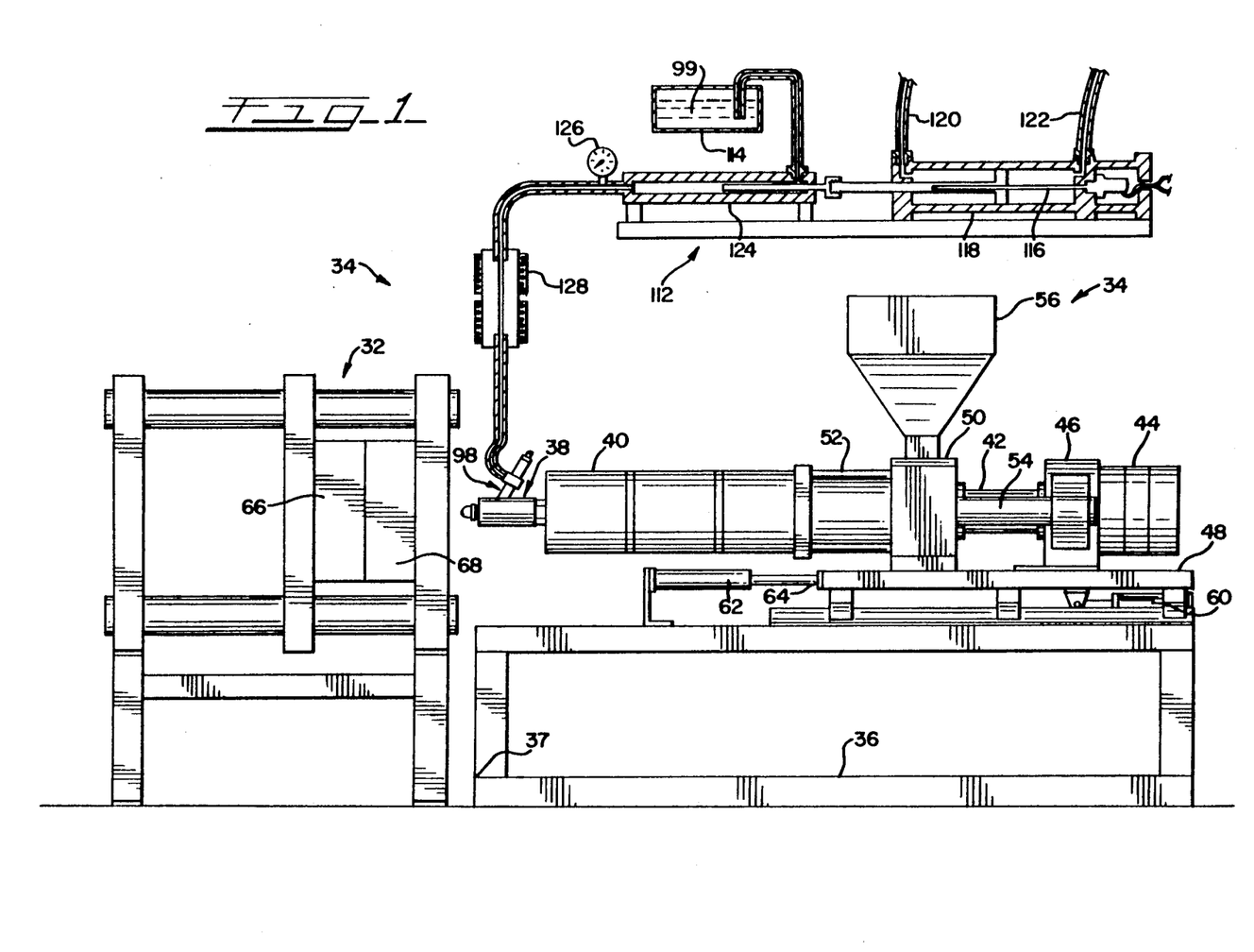
FIG. 1 is an elevation of a plastic injection molding machine for forming a hollow plastic article embodying the low pressure heat-activated gas injection process of this invention.
Figure 2:
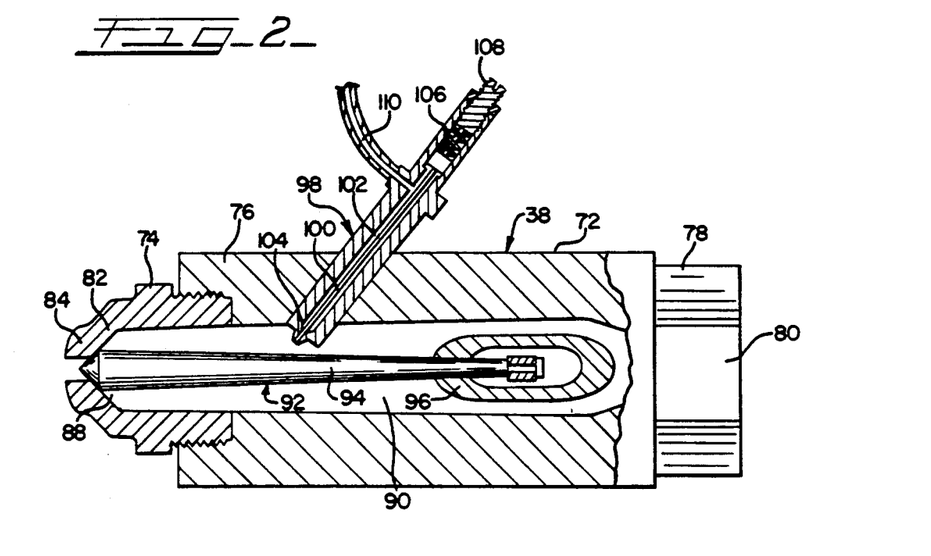
FIG. 2 is an enlarged longitudinal sectional view of the gas and plastic injection nozzle unit of FIG. 1.

There is shown in FIG. 1 a molding machine 34 with an elongated main frame 36 having the mold unit 32 positioned adjacent one end 37 to be hereinafter referred to as the forward end of the main frame 36. A nozzle unit 38, shown in detail in FIG. 2, is mounted at the forward end of an injection barrel 40 for a screw 42 driven by a motor 44 supported on a mounting member 46 on a carriage 48. The injection barrel 40 projects forwardly from a cross head 50 that is also supported on the carriage 48. The cross head 50 additionally supports a pair of cylinder assemblies 52 (only one shown) arranged on opposite sides of the barrel 40 with their associated piston rods 54 carried in the mounting member 46 for the motor 44. The cylinder assemblies 52 operate to move the injection screw 42 relative to the barrel 40 during an injection operation, with the plastic material 28 to be injected being admitted to the barrel 40 from a hopper 56. The nozzle unit 38 is movable into and out of operative association with a mold cavity inlet 58 on a reciprocal movement of the carriage 48 relative to the machine frame 36. This reciprocal movement is responsive to the operation of a double acting cylinder 60 pivotally interconnected between the carriage 48 and the frame 36 and the operation of which is controlled by a linear transducer 62 mounted on the frame 36 for coacting engagement with a limit member 64 on the carriage 48.

Figure 3:
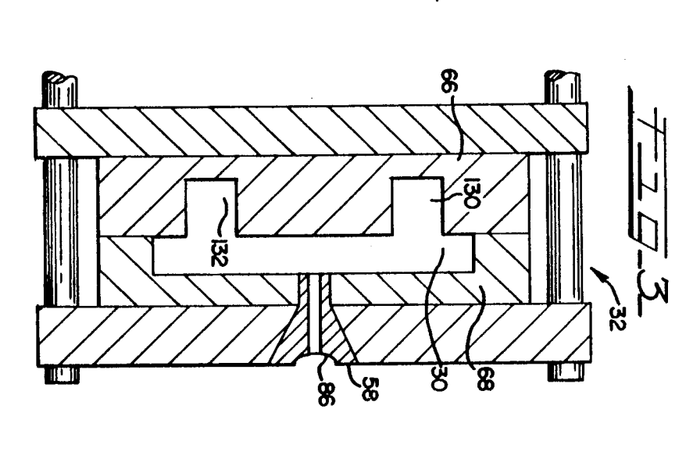
FIG. 3 is a sectional elevation of the plastic injection mold unit of FIG. 1 shown in a closed position.

The plastic injection mold unit 32 is provided having a movable first mold section 66 and a stationary second mold section 68 that are moveable into and out of mated alignment with each other. When the mold unit 32 is in its closed position (FIGS. 3 and 4), the first and second mold sections 66 and 68 form the mold cavity 30 for the plastic article 20. The second mold section 68 includes the inlet 58 for receiving the heat-activated gas in combination with the plastic material 28 from the injection nozzle unit 38.

The injection nozzle unit 38 includes a housing unit 72 comprised of three sections, namely, a forward section 74, a central section 76, and a rear section 78, the rear section 78 being interconnected in threadable connection with the forward end of the injection barrel 40. The housing unit 72 is of a generally cylindrical tubular shape having a material inlet 80 in the rear housing section 78 open to the forward end of the injection barrel 40. The forward housing section 74 has a front wall 82 formed with a central projected dome 84 for coacting engagement with a concave depression 86 at the outer end portion of the mold cavity inlet 58. The front wall 82, which constitutes the front wall of the housing unit 72, has a bore 88 of a reduced section relative to a housing axial bore 90. In this respect, it is to be noted that the bore 90 is of varying diameters as it extends through the connected housing sections 74, 76 and 78.

The admission of the plastic material 28 from the housing bore 90 into the mold cavity 30 is under the control of a valve means indicated generally at 92 and including a tubular generally conical-shaped valve member 94 and the reduced bore section 88 in the housing front wall 82. The rear end portion of the valve member 94 is slidably received in a guide housing 96 located within the axial bore 90. The valve member 94 is in engagement with the front wall 82 of the forward housing section 74 to close off the reduced bore section 88 when not in use.

The substance which will be heat-activated to its gaseous form is introduced into the nozzle unit 38 through a second valve means 98 (hereinafter called gas valve means 98 to distinguish over valve means 92) which is seated within the injection nozzle unit 38 at approximately a 45° angle with respect to the longitudinal axis of the injection nozzle unit 38. Such an acute angle allows the gas to be introduced in a confluent manner in substantially the same direction as the flow of the plastic material 28, resulting in a stratified combination of gas and plastic material 28 for flowing movement together during injection into the mold cavity 30, rather than the turbulent combination which is formed by introducing the gas in a direction which is transverse to the flow of plastic material. The gas valve means 98 includes a tubular generally cylindrical-shaped gas valve member 100 located within an axial passageway 102 which decreases in diameter at an opening 104 leading into the axial bore 90 of the nozzle housing unit 72. The gas valve member 100 is continuously urged into engagement with the opening 104 by a compression spring 106. The gas valve member 100 may be adjustably set by a screw member 108. An inlet tube 110 is located transversely to the axial passageway 102 and communicates supply means generally indicated at 112 for supplying the substance which will be heat-activated to its gaseous form to the gas valve means 98.

The supply means 112 of the preferred embodiment include means for drawing a predetermined amount of a liquid 99, such as isopropyl alcohol, from a storage reservoir 114 and then pressurizing the liquid 99 in preparation for activation by heat into a gas which is to be used in the molding process. The liquid 99 is drawn from the reservoir 114 via a linear transducer shown schematically at 116 which measures the predetermined amount of the liquid 99 in association with a hydraulic cylinder shown schematically at 118 which draws and propels the liquid 99. Hydraulic fluid supply and return lines are shown at 120 and 122, respectively. After the predetermined amount of liquid 99 has been drawn from the reservoir 114 by the hydraulic cylinder 118 and the transducer 116, it is propelled by the hydraulic cylinder 118 into a pressure intensifier shown schematically at 124 which is monitored by a pressure gauge 126. After the liquid 99 has been compressed to the desired low pressure in the intensifier 124, it may then be released in its liquid form through the gas valve means 98 and into the axial bore 90 of the injection nozzle housing unit 72 for combination with the molten plastic material 28.

The contact of the liquid with the heated molten plastic material 28 heats the pressurized liquid 99 to its gasification temperature, thus forming the heat-activated gas. Alternatively, after the liquid 99 has been compressed to the desired low pressure in the intensifier 124, it may be heated to its gasification temperature to form the heat-activated gas in a heating element shown schematically at 128 after which it may then be released in its gaseous form through the gas valve means 98 and into the axial bore 90 of the injection nozzle housing unit 72 for combination with the molten plastic material 28. The heating element 128 may also be used to preheat the liquid 99 to a temperature below gasification prior to release through the gas valve means 98. Such preheating will enhance gasification upon contact with the molten plastic material 28. In some applications, the liquid 99 may not completely gasify until it has travelled with the molten plastic material 28 into the mold cavity 30.

To inject the heat-activated gas in combination with the plastic material 28 into the mold cavity 30, the nozzle unit 38 is moved forwardly as a unit relative to the valve member 94 into engagement with the mold cavity inlet 58. The heat-activated gas and plastic material 28 are then permitted to flow into the mold cavity 30. After the desired amount of heat-activated gas has been injected with the plastic material 28 into the mold cavity 30, the gas valve means 98 are closed prior to termination of injection of the plastic material 28. The last portion of plastic material 28 which is injected into the mold cavity thus seals the gas within the plastic article 20. The nozzle unit 38 is then moved rearwardly out of engagement with the mold inlet 58 and the flow of plastic material 28 is positively cut off by engagement of the valve member 94 with the front wall 82 of the forward housing section 74 to block the reduced bore 88 of the nozzle unit 38.

Figure 4:
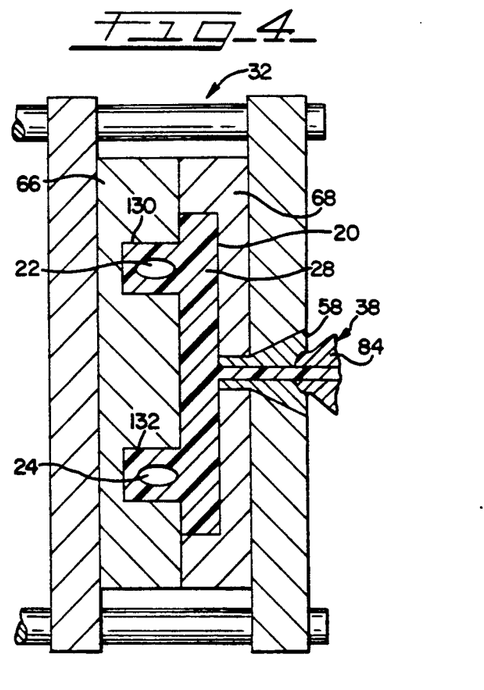
FIG. 4 shows the closed mold unit shown in FIG. 3 after a plastic has been injected into the closed mold.

When the low pressure heat-activated gas and the plastic material 28 enter the predetermined areas of the mold cavity 30 such as shown at 130 and 132 in FIG. 4, the pressure drops due to the size of the mold cavity 30 and the gas expands to exert outward pressure on the plastic material 28, thereby urging the plastic material 28 towards the walls of the mold cavity 30 to, in turn, form the hollow portions at 22 and 24.

The plastic material 28 is then allowed to cool and harden. As the plastic material 28 cools and hardens, the heat-activated gas which remains in the hollow portions at 22 and 24 begins to become dormant while continuing to exert a declining gentle outward pressure on the plastic material 28. As the heat-activated gas becomes dormant, it actually gives off heat which keeps the plastic material 28 from cooling prematurely as in the prior art. After the plastic material 28 has cooled to ambient temperature, the gas becomes completely dormant and is incapable of significant reactivation. By this time, the plastic material 28 has substantially hardened.

d section 66 is then moved away from the second mold section 68 and the resultant plastic article 20, having hollow portions at 22 and 24, is removed. The plastic material 28 may be allowed to fully cool and harden in the mold unit 32 or, preferably, after the plastic article 20 has been removed from the mold unit 32.

While the heat-activated gas is compressed to enter the melt stream of plastic material 28, it is compressed to a much lower pressure than in the prior art. For example, the heat-activated gas of the present invention may be compressed far below 500 p.s.i. whereas the gases of the prior art are often compressed from 5,000 to 10,000 p.s.i. The low pressure heat-activated gas of this invention is at a pressure which is sufficiently high to be compatible with plastic injection pressures and not retard the flow of the plastic material 28, yet not so high as to necessitate venting or other removal of the gas from the plastic article 20 prior to opening the mold unit 32. This, in turn, provides a plastic article 20 with more uniform hollow portions and smoother surfaces, as well as eliminates vent holes and reduces or eliminates deformation due to unequal shrinkage as found in the prior art. The low pressure required also reduces clamping tonnage or pressure, as well as mold costs.

The heat-activated gas improves the flow of the plastic material 28 and eliminates the sinking found in the prior art in another way as well. A plastic molded article generally cools from the outside in. However, the compressed nitrogen gas of the prior art has a chilling effect on the plastic material causing interior portions of the plastic article to cool and harden faster than outer portions thereof. As the material hardens, it contracts, therefore providing an unpredictable and usually asymmetrical inward stress on the part, thus resulting in sinking towards the chilled center.

Figure 5:
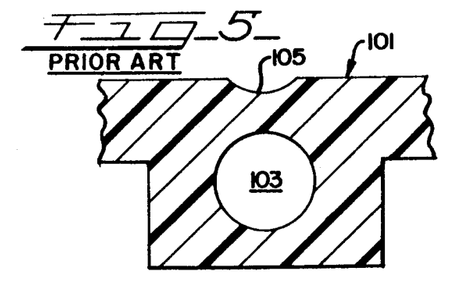
FIG. 5 illustrates a hollow plastic article formed by a prior art plastic injection process.
Figure 6:
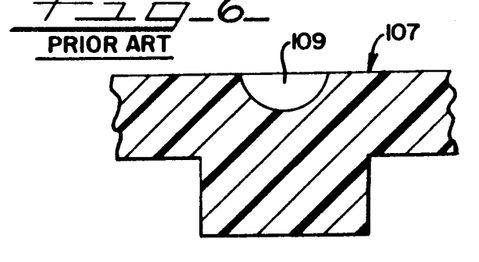
FIG. 6 illustrates a second hollow plastic article formed by a prior art plastic injection process.

Two types of sinking found in the prior art are shown in FIGS. 5 and 6 respectively. FIG. 5 illustrates a plastic article 101 where the chilling effect of the nitrogen gas located in hollow portion 103 has caused the inside of the plastic article 101 to cool faster than the outside of the plastic article 101. As the inside of the plastic article 101 shrinks faster than the outside of the plastic article 101, an inward stress causes the outside of the plastic article 101 to sink as shown at 105. The other type of shrinkage is illustrated in FIG. 6 which shows a plastic article 107 in which the nitrogen gas has been vented, thus leaving the plastic article 107 without the continuous outward pressure to keep the plastic article 107 from sinking at 109.

Figure 7:
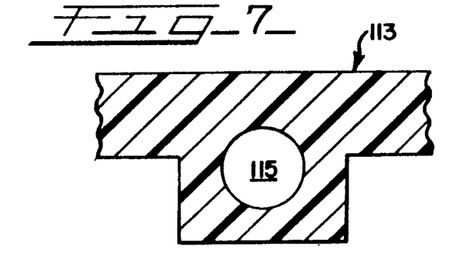
FIG. 7 illustrates a hollow plastic article formed by the process of this invention.

FIG. 7 illustrates a plastic article 113 which has been made by the process of the present invention. Since the heat-activated gas is not vented, a gentle, declining outward pressure is continuously maintained until the plastic article 113 has substantially hardened, such pressure exerted from the inside by the low pressure gas located in hollow portion 115 thereby allowing the plastic article 113 to cool and harden more evenly and thus have outer portions shrink more evenly and predictably.

Since the high pressure gas of the prior art must exit the mold prior to opening of the mold or else risk explosion, it is not present to stop or limit unequal shrinkage which occurs after the plastic article has been removed from the mold. The low pressure heat-activated gas of the present invention continues to exert gentle outward pressure from within the plastic article until the gas becomes dormant after substantial cooling and hardening of the plastic article. This allows for the reduction of deformations due to unequal shrinkage as well as the predictable production of thick and thin sections in the same part. The low pressure heat-activated gas is critically important to reducing or eliminating this deformation due to unequal shrinkage since the greatest amount of shrinkage due to cooling and hardening in a plastic article occurs after the plastic article has been removed from the mold.

Figure 10:
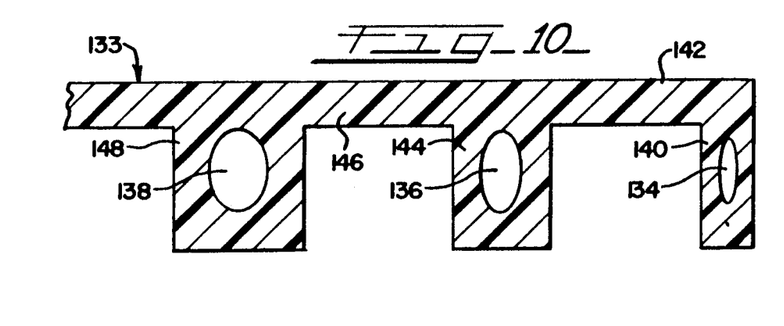
FIG. 10 illustrates a plastic article having hollow portions positioned at specified locations therein which have been formed by the process of this invention.

As previously stated, the heat-activated gas is introduced into the plastic material 28 as the plastic material 28 is injected into the mold cavity 30. It is not introduced separately or subsequently as in the prior art. This allows a precise release of the gas into the plastic material 28 as desired to form hollow portions in specific locations of a plastic article 133 such as shown at 134, 136 and 138 in FIG. 10. This is accomplished by computerizing the gas valve means 98 so a predetermined amount of the gas may be released at a predetermined time along the melt to reach a predetermined location within the plastic article 133. A controller (not shown) may be used to start and stop the gas flow and the linear transducer 116 may be used to measure the predetermined amount of gas in its liquid form 99. For example, in the plastic article 133 shown in FIG. 10, the controller would open the gas valve means 98 for a short period of time to form the hollow portion 134 in the vertical rib 140, then close the gas valve means 98 to form the solid horizontal member 142, then open the gas valve means 98 for a longer period of time to form the hollow portion 136 in the thicker vertical rib 144, then close the gas valve means 98 to form the solid horizontal member 146, then open the gas valve means 98 for still a longer period of time to form the hollow portion 138 in the even thicker vertical rib 148, and so on. A solid shot of plastic material 28 with no gas is always contemplated at the end of an injection to seal the gas within the plastic article.

Isopropyl alcohol is preferred as the low pressure heated liquid gas due to its low boiling point or gasification temperature (approximately 100° C.), as well as its acceptable flash point, resistance to decomposition at elevated temperatures, and toxicity characteristics. Other compounds such as alternative alcohols, petroleum hydrocarbons, inorganic alkali carbonates, organic esters, and fluorocarbons could also be used. In fact, it is anticipated that water, ammonium hydroxide, as well as other liquid or even solid substances which may be heated to their gasification temperatures under low pressure and will produce a cavity in a molten polymer mass, either crystalline or amorphous or blends, could be used. It is advantageous if the liquid or solid can be heated to its gasification temperature by the molten plastic material 28 which can range from 200° C.-800° C. depending on the plastic material used. Therefore, a boiling point range for the liquid or solid from 60° C. to 400° C. or more is contemplated. Accordingly, the heating element 128 is only necessary for liquids or solids with higher boiling points or when it is desirable to induce such a large amount of gas that the molten plastic material 28 cannot adequately heat the liquid or solid to its gasification temperature.

Azeotropic mixtures of compounds, that is, single phase mixtures of two or more compounds that have a constant boiling point so as to be incapable of separation by distillation, are contemplated where certain characteristics of the combination are desirable which are not found in the individual compounds alone. For example, an azeotropic mixture of ethyl alcohol and water would have different expansion characteristics than either ethyl alcohol or water alone. When these two compounds are combined in a liquid solution, the volume of liquid actually decreases as compared to the two liquid compounds taken separately. Accordingly, this could lead to a greater expansion upon conversion of the liquid azeotropic mixture to gas. Such an increase in expansion may lead to an enhanced hollow plastic part.

Another azeotropic mixture which is anticipated is isopropyl alcohol and water. The mixture has a constant boiling point but is less costly to produce. In addition, a mixture of 87.4% pure isopropyl alcohol and 12.6% water has been found to liberate nearly 10% more gas than isopropyl alcohol alone.

Figure 8:
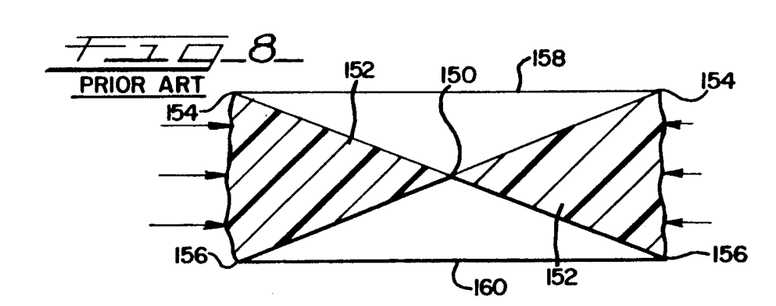
FIG. 8 illustrates a flow of plastic material in a mold cavity of a prior art plastic injection process.
Figure 9:
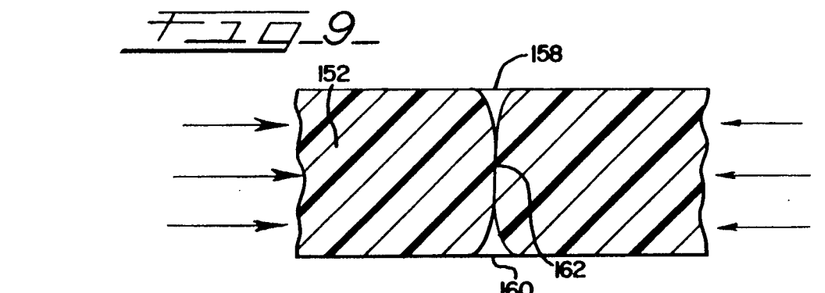
FIG. 9 illustrates a flow of plastic material in a mold cavity of the process of this invention.

Another feature of the heat-activated gas is the reduction of knit lines which are formed in the plastic article 20 where the plastic material flows into contact with itself from separate directions. As shown in FIG. 8, without gas pressure, the center 150 of a plastic material 152 travels faster than the outside edges 154 and 156 during injection due to the frictional braking effect of the mold cavity walls 158 and 160. This causes a breakout in the flow of the plastic material 152 as shown in FIG. 8. It is known that the front of the flow could be squared by providing a counter pressure from a gas. This has not been effective with the compressed nitrogen gas of the prior art, however, since the nitrogen gas tends to freeze the breakout shape of the flow and does not, therefore, reshape the front of the flow as desired. The counter pressure created by the heat-activated gas of the present invention, however, does indeed square or soften the front 162 of the flow as shown in FIG. 9 and produces less drastic knit lines, thereby reducing stress in the plastic article.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is contemplated that this invention may be used in combination with the molding in of inserts such as textiles, metals or films, etc.

I claim:

1. A process of injection molding for forming a plastic article which is hollow in at least a portion thereof, said process comprising:
   A. providing a mold apparatus, including a first section and a second section opposite to an in mated alignment with said first section, said mold apparatus further having an inlet for receiving an injection material;
   B. clamping said first mold section and said second mold section together to form an injection mold cavity for said plastic article;
   C. introducing a substance into contact with a molten plastic material, said substance and said plastic material forming said injection material;
   D. injecting said injection material through said inlet and into said mold cavity, said plastic material heating said substance to its gasification temperature to form a heat-activated gas, said substance expanding in its heated gaseous form to urge said plastic material towards the walls of said mold cavity to form said hollow portion of said plastic article therein;

E. allowing said plastic material to at least partially cool and harden with said gaseous substance remaining therein, said gaseous substance becoming dormant as said plastic material cools and hardens; and F. removing said resultant plastic article from said mold cavity.

2. The process, according to claim 1, wherein said plastic material is allowed to substantially cool and harden after removing said resultant plastic article from said mold cavity, said gaseous substance becoming completely dormant after said plastic material has substantially hardened.

3. The process, according to claim 1, wherein said plastic material is allowed to substantially cool and harden before removing said resultant plastic article from said mold cavity, said gaseous substance becoming completely dormant after said plastic material has substantially hardened.

4. The process, according to claim 1, wherein said gaseous substance continues expanding and urging said plastic material towards said walls of said mold cavity until said gaseous substance becomes dormant upon substantial cooling and hardening of said plastic material.

5. The process, according to claim 1, further comprising the step of terminating the introduction of said substance prior to terminating the injection of a final portion of said plastic material, said final portion of said plastic material thereby sealing said gaseous substance within said plastic article.

6. The process, according to claim 1, wherein said gaseous substance is supplied to said injection mold cavity in the following steps:
   A. drawing a predetermined amount of a liquid from a supply reservoir;
   B. urging said liquid into means for pressurizing said liquid;
   C. introducing said pressurized liquid into contact with said plastic material, said liquid introduced in substantially the same direction as the flow of said plastic material, said plastic material thereby heating said liquid to its gasification temperature to form said gaseous substance; and
   D. injecting said gaseous substance in combination with said plastic material into said mold cavity.

7. The process, according to claim 6, wherein the injecting of said gaseous substance is at predetermined times and amounts in combination with said plastic material to form said hollow portions at specified locations in said plastic article.

8. The process, according to claim 1, wherein said gaseous substance is supplied to said injection mold cavity in the following steps:
   A. drawing a predetermined amount of a liquid from a supply reservoir;
   B. urging said liquid into means for pressurizing said liquid;
   C. urging said pressurized liquid into a heating element and heating said liquid to a temperature below its gasification temperature;
   D. introducing said pressurized heated liquid into contact with said plastic material thereby heating said liquid to its gasification temperature to form said gaseous substance; and
   E. injecting said gaseous substance in combination with said plastic material into said mold cavity.

9. The process, according to claim 8, wherein the introduction of said gaseous substance is at predetermined times and amounts in combination with said plastic material to form said hollow portions at specified locations in said plastic article.

10. The process, according to claim 6, wherein said substance is compressed to a pressure below 500 p.s.i.

11. The process, according to claim 1, wherein said substance is a liquid.

12. The process, according to claim 11, wherein said liquid has a boiling point in the range from 60° C. to 400° C.

13. The process, according to claim 11, wherein said liquid is a compound selected from the group consisting of alcohols, petroleum hydrocarbons, alkali carbonates, esters, fluorocarbons, ammonium hydroxide and water.

14. The process, according to claim 11, wherein said liquid is a mixture of at least two compounds selected from the group consisting of alcohols, petroleum hydrocarbons, alkali carbonates, esters, fluorocarbons, ammonium hydroxide and water.

15. The process, according to claim 11, wherein said liquid is isopropyl alcohol.

16. The process, according to claim 1, wherein said substance is solid.

17. A process of injection molding for forming a plastic article which is hollow in at least a portion thereof, said process comprising:
   A. providing a mold apparatus, including a first section and a second section opposite to and in mated alignment with said first section, said mold apparatus further having an inlet for receiving an injection material;
   B. clamping said first mold section and said second mold section together to form an injection mold cavity for said plastic article;
   C. injecting said injection material comprising a heat-activated gas in confluence with a plastic material for flowing movement together through said inlet and into said mold cavity, said heat-activated gas formed by introducing a substance with said plastic material thereby heating said substance to its gasification temperature, said heat-activated gas being compressed to a pressure below 500 p.s.i., said heat-activated gas expanding upon injection into said mold cavity thereby urging said plastic material towards the walls of said mold cavity to form said hollow portion of said plastic article therein;
   D. terminating the injection of said heat-activated gas;
   E. injecting a final portion of said plastic material through said inlet and into said mold cavity, said final portion of said plastic material thus sealing said heat-activated gas within said hollow portion of said plastic articles;
   F. allowing said plastic material to at least partially cool and harden with said heat-activated gas remaining therein, said gas becoming dormant as said plastic material cools and hardens; and
   G. removing said resultant plastic article from said mold cavity.

18. The process, according to claim 17, wherein said plastic material is allowed to substantially cool and harden after removing said resultant plastic article from said mold cavity, said gas becoming completely dormant after said plastic material has substantially cooled and hardened.

19. The process, according to claim 17, wherein said plastic material is allowed to completely cool and harden before removing said resultant plastic article from said mold cavity, said gas becoming completely dormant after said plastic material has substantially cooled and hardened.

20. The process, according to claim 17, wherein said heat-activated gas continues expanding and urging said plastic material towards said walls of said mold cavity until said gas becomes dormant after substantial cooling and hardening of said plastic material.

21. The process, according to claim 17, wherein said heat-activated gas is supplied to said injection mold cavity in the following steps:
   A. drawing a predetermined amount of a liquid from a supply reservoir;
   B. urging said liquid into means for pressurizing said liquid;
   C. introducing said pressurized liquid into contact with said plastic material in a confluent manner thereby heating said liquid to its gasification temperature to form said heat-activated gas; and
   D. injecting said heat-activated gas in flowing movement together with said plastic material into said mold cavity.

22. The process, according to claim 21, wherein the introduction of said pressurized liquid into contact with said plastic material is at predetermined times and amounts to form said hollow portions at specified locations in said plastic article.

23. The process, according to claim 17, wherein said heat-activated gas is supplied to said injection mold cavity in the following steps:
   A. drawing a predetermined amount of a liquid from a supply reservoir;
   B. urging said liquid into means for pressurizing said liquid;
   C. urging said pressurized liquid into a heating element and heating said liquid to its gasification temperature to form said heat-activated gas;
   D. introducing said heat-activated gas into contact with said plastic material in a confluent manner; and
   E. injecting said heat-activated gas in flowing movement together with said plastic material into said mold cavity.

24. The process, according to claim 23, wherein the introduction of said heat-activated gas is at predetermined times and amounts in combination with said plastic material to form said hollow portions at specified locations in said plastic article.

25. A process of injection molding for forming a plastic article which is hollow in at least a portion thereof, said process comprising:
   A. providing a mold apparatus, including a first section and a second section opposite to and in mated alignment with said first section, said mold apparatus further having an inlet for receiving an injection material;
   B. clamping said first mold section and said second mold section together to form an injection mold cavity for said plastic article;
   C. drawing a liquid from a supply reservoir;
   D. urging said liquid into means for pressurizing said liquid to a pressure below 500 p.s.i.;
   E. introducing said pressurized liquid into contact with said plastic material, said liquid introduced in substantially the same direction as the flow of said plastic material, said plastic material thereby heating said liquid to its gasification temperature to form a heat-activated gas;
   F. injecting said heat-activated gas in combination with said plastic material into said mold cavity, said heat-activated gas expanding upon injection into said mold cavity thereby urging said plastic material towards the walls of said mold cavity to form said hollow portion of said plastic article therein;
   G. terminating the introduction of heat-activated gas;
   H. injecting a final portion of said plastic material through said inlet and into said mold cavity, said final portion of said plastic material thus sealing said heat-activated gas within said hollow portion of said plastic article;
   I. removing said resultant plastic article from said mold cavity; and
   J. allowing said plastic material to cool and harden, said heat-activated gas continuing to expand and urge said plastic material towards said outer walls of said mold cavity until said gas becomes dormant upon substantial cooling and hardening of said plastic material.

26. The process, according to claim 25, wherein the introduction of said pressurized liquid into contact with said plastic material is at predetermined times and amounts to form said hollow portions at specified locations in said plastic article.

27. The process, according to claim 25, wherein said liquid is preheated to a temperature below its gasification temperature prior to introducing said liquid into contact with said plastic material.

* * * * *

UNITED STATES PATENT AND TRADEMARK OFFICE
CERTIFICATE OF CORRECTION

PATENT NO. : 5,139,714
DATED : August 18, 1992
INVENTOR(S) : Siebolt Hettings

It is certified that error appears in the above-indentified patent and that said Letters Patent is hereby corrected as shown below:

Column 6, line 1, should begin a new paragraph, but should read
--The first mold section 66 is then moved away from the second --.

Column 8, line 51, should read --tion and a second section opposite to and in mated --.

Signed and Sealed this

Fourteenth Day of September, 1993

Attest:

BRUCE LEHMAN

Attesting Officer

Commissioner of Patents and Trademarks